Oct. 11, 1960   D. L. SPOTTEN ET AL   2,955,622
SKEIN WINDING FIXTURE FOR MINIATURE SKEIN-WOUND STATORS
Filed Nov. 4, 1957   2 Sheets-Sheet 2

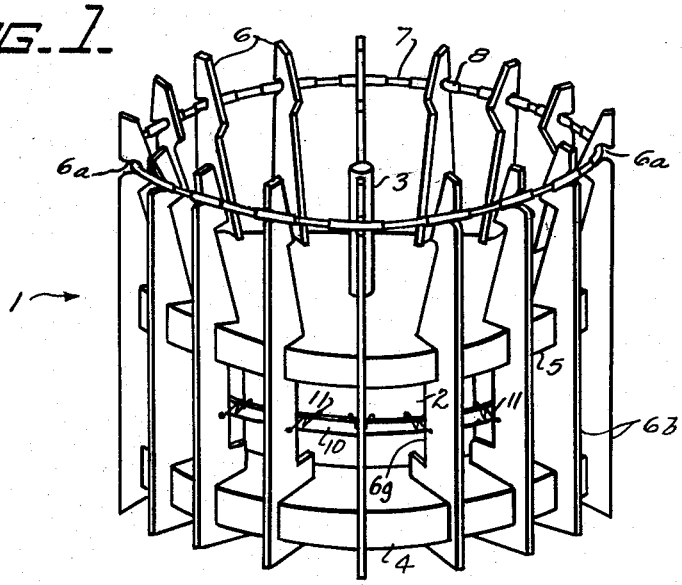

INVENTORS.
DOUGLAS L. SPOTTEN
GERALD E. HINDERER
BY
ATTORNEY
AGENT

United States Patent Office 2,955,622
Patented Oct. 11, 1960

2,955,622

SKEIN WINDING FIXTURE FOR MINIATURE SKEIN-WOUND STATORS

Douglas L. Spotten and Gerald E. Hinderer, Baltimore, Md., assignors, by mesne assignments, to the United States of America as represented by the Secretary of the Air Force Filed Nov. 4, 1957, Ser. No. 694,464

2 Claims. (Cl. 140—92.1)

This invention relates generally to the formation of the individual coil turns of stator windings into a single skein and, more particularly, to the utilization of a fixture for winding many turns of wire into a single skein which is then inserted in the various slots of a stator.

In the type of stator windings heretofore used, the stator slots have been initially lined with insulating material and a number of loosely mounted wire skeins inserted therein with a strip of stiff fish paper, for example, being used to cover said windings to hold the wires in place. With this arrangement, it has been difficult to keep the skeins properly spaced in the stator slots and frequently loops of wire that were either too tight or too loose were formed causing a short circuit to the stator and thereby effecting considerable damage to the windings. The present invention has eliminated the above disadvantages by the development of a new fixture which greatly simplifies the winding operation and, at the same time, ensures uniformity in the stator windings.

An object of the present invention, therefore, is to provide a skein winding fixture which ensures automatic winding of the stator.

A further object of the invention resides in a skein winding fixture utilizing means to protect the wires therein from damage when mounted on said fixture.

A still further object of the invention utilizes mechanism for facilitating removal of the complete skein from the winding fixture without breaking the wire therein.

Another object of the invention involves a skein winding fixture for winding miniature stators having means incorporated therein to keep the skein formed thereby properly spaced in the stator slots and eliminate the probability of shorts between said skein and said stator.

Other objects and advantages of the invention will become apparent from the following description, taken in connection with the accompanying drawings, in which like reference characters refer to like parts in the several figures:

Fig. 1 is a perspective view of the skein-winding fixture of the invention, illustrating the completed skein in its engaged position.

Fig. 2 is a second perspective view of the fixture of Fig. 1, illustrating operation thereof to disengage the completed skein preparatory to its removal therefrom.

Figure 3:
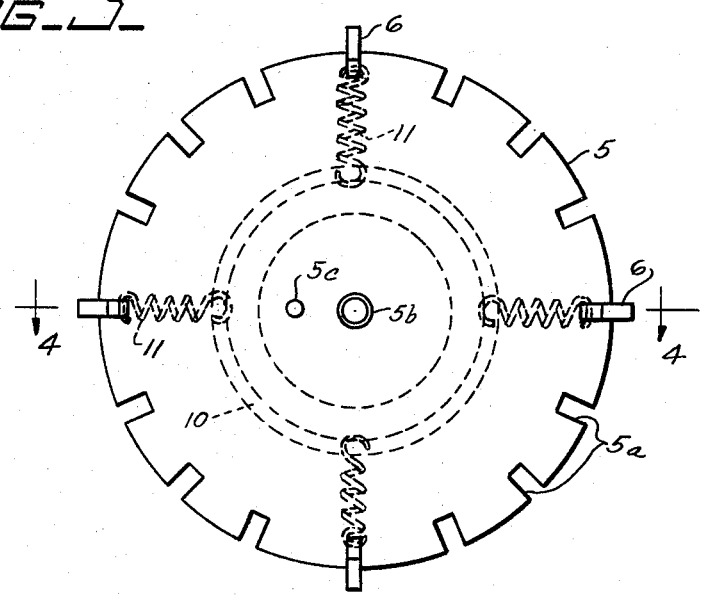
Fig. 3 is a top view of the upper disk utilized with the fixture of Figs. 1 and 2, illustrating four of the fingers thereof in their slot engaging position.

With particular reference to Figs. 1 and 2 of the drawings, the skein-winding fixture of the present invention includes a spider form indicated generally at 1 and comprising a main hub 2, a relatively long support rod or standard 3 centrally mounted in said hub 2 and extending above and below the upper and lower surfaces thereof, respectively, a lower, immovable disk 4 affixed to said rod or standard 3 in contact with the lower surface of hub 2, an upper movable disk 5 slidably mounted on said rod or standard 3 adjacent to and in contact with the upper surface of hub 2 when in its lowermost position, and a plurality of fingers 6 in resilient contact with said upper and lower disks 5 and 4. Each of said fingers 6 incorporates a notch or slot 6a adjacent its upper end and it is these notches 6a in which is wound the wire coil 7. As stated above, upper disk 5 is slidably supported on rod or standard 3 and after the winding operation is completed, said upper disk 5 is moved upwardly towards the notched or slotted end of said fingers 6 as seen clearly in Fig. 2 of the drawings. Because of a particular arrangement between the engagement of each finger 6 with said upper disk 5 to be explained in detail hereinafter with particular reference to Fig. 4 of the drawings, each finger 6 is forced inwardly towards the center of spider form 1 to facilitate removal of the completed coil 7 therefrom. Prior to the removal of said coil 7, an insulation tape 8 is wrapped around each exposed portion thereof between adjacent fingers 6. It is these tapes 8 which are utilized to prevent damage to wire coil 7 when mounted in the stator slots.

Figure 4:
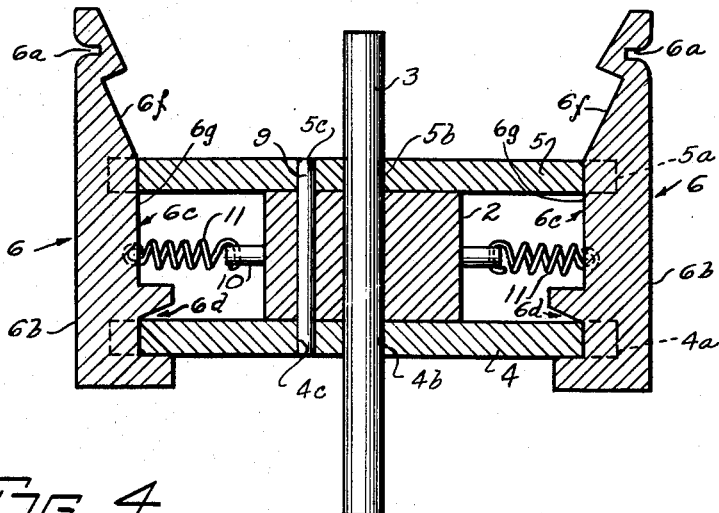
Fig. 4 is a view taken about on section 4—4 of Fig. 3, illustrating details of the mounting arrangement for the fingers of Fig. 3 partly in section and partly broken away.

Referring specifically to Fig. 3 of the drawings, the particular construction of the disks 4, 5 is clearly illustrated. Each of said disks 4, 5 is identical and, for that reason, reference is made initially only to various details of the upper movable disk 5. A particular arrangement is illustrated only for the purpose of clarity and it is understood that various other arrangements may be utilized without departing from the spirit or scope of the invention. Said disk 5 is circular in shape and incorporates a total of sixteen slots 5a on its circumference which slots 5a engage in overlapping relation in corresponding slots (to be described hereinafter) incorporated in fingers 6. In addition, said disk 5 incorporates a relatively large central opening 5b which opening 5b receives the previously described relatively long support rod or standard 3. Furthermore, an additional relatively small eccentric opening 5c is incorporated in said disk 5 which opening 5c receives a relatively short rod 9 whose purpose will be described hereinafter. As seen clearly in Fig. 4 of the drawings, the lower disk 4 is mounted on said rod or standard 3 parallel to and in direct alignment with disk 5 which disk 4 has slots 4a and openings 4b and 4c, respectively, identical to slots 5a and openings 5b and 5c of disk 5. Said relatively short rod 9 is affixed to said disk 4 in opening 4c and is slidably mounted in opening 5a in disk 5. The purpose of relatively short rod 9 is to ensure that the various openings 5b and 5c and slots 5a of disk 5 are correctly aligned with the corresponding openings and slots in the disk 4 when disk 5 is in its lowermost position preparatory to the winding operation. Each of said fingers 6 (Two of which are illustrated in Fig. 4) incorporates an outer straight surface 6b, and an inner surface indicated generally at 6c. Said outer surface 6b incorporates the notch or slot 6a previously mentioned as provided for engagement with the coil 7 during the winding operation. Said inner surface 6c incorporates a lower notch or slot 6d which slot 6d engages in overlapping relation with one of said corresponding circumferential slots 4a in lower disk 4. Surrounding hub 2 is a circumferential ring 10 whose purpose will be hereinafter explained. In addition, the inner surface 6c of each finger 6 incorporates a straight, intermediate surface portion 6g disposed in parallel relation to each other and in overlapping engagement in a corresponding circumferential slot 5a of upper disk 5 when the latter is in its lowermost position as clearly seen in Figs. 1 and 2 of the drawings. Adjacent said straight surface portion 6g the inner surface 6c of each finger 6 also incorporates a portion slanted outwardly toward the upper or slotted end thereof as indicated generally at 6f, Normally, each finger 6 is retained in its outermost position by upper disk 5 when the latter is in its lowermost or finger-engaging position. A separate spring 11 is attached between each finger 6 and the circumference of ring 10 as clearly shown in Fig. 4 of the drawings. When upper disk 5 is in said lowermost position, springs 11 resiliently hold each of said fingers 6 in overlapping engagement with respective slots 5a with the upper surface of each of said slots 5a positioned in flush relation to the juncture between intermediate surface portion 6g and slanted surface portion 6f. After the winding operation is completed, it is only necessary to manually move disk 5 upwardly against the action of springs 11 towards the slotted end of each finger 6 disengaging the normal engagement of the aforesaid straight surface portion 6g of each finger 6 from each of said slots 5a of said disk 5 at which point the aforesaid plurality of slots 5a immediately engage with the outwardly slanted surface portion 6f on the inner surface of each finger 6 immediately collapsing the latter inwardly still under action of springs 11 and thereby relieving pressure on the completed coil 7 engaged in the slots 6a of each finger 6. This latter operation, of course, facilitates removal of the completed coil 7. It is at this time prior to the actual removal of said coil 7 that insulation tape 8 is wrapped around each exposed portion of the coil 7 which lies between adjacent fingers 6. In this manner, completed coil 7 may now be removed from the spider form 1 and placed in the desired stator slots, the plurality of tapes 8 holding the individual wires of the coil 7 together and thus preventing damage thereto and insuring uniform loops throughout.

Thus, a new and improved skein-winding fixture has been developed in the present invention wherein the individual coil turns forming the winding to be placed in the slots of a stator are, first, formed into a single skein by winding on the inventive spider form 1 and then wrapping the skein with mylar (insulating) tape 8 at a plurality of sections wherever the coil turns will rest in a respective stator slot eliminating the heretofore need for separate insulating paper to be placed in each slot followed by the usual damage thereto when fine wire was utilized. Moreover, with the use of the inventive spider form 1 and its simplicity of operation, damage to the coil inherent in former methods of removal thereof has been substantially eliminated. In addition, the present inventive device assures that the skein or coil 7 is properly spaced in the stator slots and that the loops formed thereby are correct and uniform in length and will not become either too tight or too loose effecting a short circuit to the stator and thus ruin the winding. Furthermore, the winding fixture 1 of the present invention enables storage of the completed coil 7 as a compact unit for a substantial period of time before utilizing the same as the winding to be inserted in the slots of a stator, since the mylar (insulating) tape 8 prevents any tangling of the wires in said coil 7.

We claim:

1. A skein-winding fixture for miniature skein-wound stators, including, a spider form comprising a main support cylindrical hub having a relatively large, central, longitudinal opening, a circumferential ring mounted on said hub intermediate the upper and lower surfaces thereof, a relatively elongated rod rigidly positioned in said central longitudinal opening extending outside of said opening at both ends thereof, an upper disk slidably mounted on said elongated rod adjacent the upper surface of said hub and adaptable to be moved between a lower and an upper position, a lower disk fixed on said elongated rod adjacent the bottom surface of said hub, each of said upper and lower disks having a plurality of spaced circumferential notches, a plurality of relatively elongated fingers resiliently mounted on said upper and lower disks, each of said fingers having an inwardly facing notch adjacent the lower end of the inner surface thereof in engagement with an aligned circumferential notch in said lower disk, an outwardly facing slot adjacent the upper end of each of said plurality of fingers on the outer surface thereof, a plurality of wire coil turns wound around said outwardly facing slots to form a single skein in taut engagement therein when said upper disk is in the lower position, sections of insulating tape wrapped around portions of said skein exposed between adjacent fingers, said selected insulated portions being adapted for engagement in the slots of a stator, and spring means between an intermediate portion of said plurality of fingers and the circumference of said ring urging said fingers inwardly towards a notch-engaging position with said upper and lower disks, said upper disk incorporating a plurality of spaced, peripherally disposed notches and movable between a lower finger notch-engaging position and an upper finger notch-disengaging position, said peripherally disposed notches of said upper disk in engagement with each of said fingers when in the lower position and said plurality of fingers each incorporating an upper, outwardly flared, slanted inner portion and a straight, parallel portion adjoined thereto, the juncture of said adjoined slanted and parallel portions being in engagement with said peripherally disposed notches and retaining said plurality of fingers in their outermost wire-tensioning position in said slots against the urging of said spring means when said upper disk is in its lower position and collapsing said plurality of fingers under action of said spring means when said upper disk is in its upper position, said upper disk being in continuous contacting support with the outwardly flared, slanted portions of said fingers during its upward movement effecting progressively inward movement of said fingers under the continual urging of said spring means, said main support hub and said upper and lower disks having aligned eccentric openings extending therethrough receiving a relatively short rod affixed in said eccentric opening and extending above and below the upper and lower surfaces of said hub, said relatively short rod affixed to the eccentric opening in said lower disk and slidably engaged in the eccentric opening in said upper disk when said upper disk is in its lowermost position.

2. A spider form for winding a plurality of individual wires into a single wire coil adapted for engagement in the slots of a stator, comprising a cylindrical base element having a central opening, an upright support member mounted in said central opening and extending outwardly therefrom in opposite directions, a first fixed plate-like member mounted on said upright support member on one side of said base element, a plurality of elongated projecting elements resiliently attached at one end in spaced relation on the circumference of said first fixed plate-like member, a plurality of individual wires formed into a single coil in engagement with the upper ends of said plurality of elongated projecting elements, a plurality of springs positioned between each of said elongated projecting elements and said cylindrical base element exerting inward collapsing pressure on said elongated projecting elements relieving pressure on said coil, and a second plate-like member slidably mounted on said upright support member on the side remote from said first plate-like member and movable between a lower, engaged position with said plurality of elongated projecting elements resisting the inward collapsing pressure exerted thereon and exerting pressure on said single coil formed thereon and an upper, disengaged position collapsing said plurality of elongated projecting elements inwardly under action of said plurality of springs, said first fixed plate-like member having a plurality of slots spaced along the circumference thereof and each of said plurality of elongated projecting elements having a lower, inner slot held in resilient overlapping engagement within each of said first plate-like member circumferential slots by said plurality of springs, and said second plate-like member having a plurality of identical circumferential slots incorporated therein and each of said plurality of elongated projecting elements having an upper, straight inner portion spaced and extending from a point near said first-named plurality of slots upwardly to the juncture with an upper outwardly tapered, slanted portion, the juncture therebetween being in resilient overlapping engagement with each of said plate-like member circumferential slots by said plurality of springs when said second plate-like member is in engagement with said elongated projecting elements, said single coil having insulating tape wrapped thereon at predetermined locations along its circumference adaptable for engagement in corresponding slots in the stator to ensure that the individual wires therein are held together in a single skein.

References Cited in the file of this patent

UNITED STATES PATENTS

| | | |
|---|---|---|
| 73,573 | Brooks | Jan. 21, 1868 |
| 1,825,604 | Ray | Sept. 29, 1931 |
| 1,901,226 | Carter | Mar. 14, 1933 |
| 1,958,838 | Roelofs et al. | May 15, 1934 |
| 2,821,946 | Goekler | Feb. 4, 1958 |